United States Patent [19]

Maddox et al.

[11] Patent Number: 5,051,007

[45] Date of Patent: Sep. 24, 1991

[54] LUBRICATION OF A CENTRIFUGAL PUMP BEARING

[75] Inventors: George J. Maddox; Leon K. Stanmore, both of Dallas, Tex.; Terry M. Wold, Mcalester, Okla.

[73] Assignee: National-Oilwell, Houston, Tex.

[21] Appl. No.: 415,841

[22] Filed: Oct. 2, 1989

[51] Int. Cl.⁵ .......................................... F16C 33/66
[52] U.S. Cl. .................................... 384/606; 384/465
[58] Field of Search ............... 384/606, 368, 369, 135, 384/136, 472, 465

[56] References Cited

U.S. PATENT DOCUMENTS

| | | | |
|---|---|---|---|
| 2,327,962 | 8/1943 | Drake | 184/6 |
| 3,318,644 | 5/1967 | Johnson, III | |
| 4,068,740 | 1/1978 | Quinn et al. | 184/6.12 |
| 4,666,381 | 5/1987 | Butterworth | 418/55 |
| 4,700,808 | 10/1987 | Haentjens | 184/6.18 |

Primary Examiner—Lenard A. Footland
Attorney, Agent, or Firm—R. J. Bunyard; L. A. Fillnow; R. H. Johnson

[57] ABSTRACT

Lubrication system for a centrifugal pump having a bearing mounted around a rotatable vertical shaft. The lubrication system includes a reservoir for holding a quantity of lubricant, structure for withdrawing lubricant from the reservoir, a stator, and a passageway for communicating lubricant from the reservoir to the bearing. The withdrawing structure includes a rotor connected to the vertical shaft. The stator encircles the rotor with the rotor and stator extending axially into the reservoir. The stator minimizes vortexing and churning of the lubricant in the reservoir during rotation of the rotor. Dynamic seals are not necessary with the lubrication system. Accordingly, concern of heat generation and wear associated with dynamic seals has been eliminated.

13 Claims, 8 Drawing Sheets

LUBRICATION OF A CENTRIFUGAL PUMP BEARING

BACKGROUND OF THE INVENTION

This invention relates to lubrication of a bearing mounted around a vertical rotatable shaft in machines such as centrifugal pumps, engines, drill motors, and the like. The invention includes a reservoir for holding lubricant, means for withdrawing lubricant from the reservoir and for pumping the withdrawn lubricant to the bearing, a stator, and a passageway for communicating lubricant withdrawn by the withdrawing means to the bearing. The withdrawing means includes a rotor connected to the shaft. The stator, while encircling the rotor and extending axially into the reservoir, minimizes vortexing and churning of the lubricant by the rotor.

It is well known to use enclosed lubrication systems to lift lubricant to a vertically mounted bearing using a rotating inverted cone or flinger or using a wick. Inverted cones, screws or flingers pump lubricant from a reservoir while wicks remove lubricant from the reservoir by capillary action. These lubricating systems are not completely satisfactorily for high speed machines, i.e., 3550 RPM or more. When vertically pumping hot liquids using a pump, there is a tendency for heat to rise and be transported through the vertical shaft and bearing bracket into the lubricant and the bearing. For those machines that include a plurality of bearing sets having a common lubricant reservoir, heat is transported from one bearing set to another by the lubricant. A lubrication system must not only deliver an adequate amount of lubricant to minimize wear of the bearing but also be capable of providing a maximum amount of cooling of the bearing without generating an excessive amount of heat. A lubrication system must be as efficient as possible without generating excessive heat. Lubrication systems using inverted cone, screw, or flinger type pumps may be efficient but normally generate excessive heat. They generate heat because of churning and vortexing of the lubricant caused by the spinning action of the cone or flinger slicing through the lubricant in the reservoir. Churning results when the lubricant is sheared and agitated such as when an impeller, a vaned device or a cone is forced through the lubricant. This creates heat because of internal shearing of the lubricant molecules and also tends to degrade the lubricant because of emulsification. Vortexing (spinning of the lubricant) creates heat as a result of internal shearing of the outer boundary layer of lubricant in the reservoir and friction between the wall of the reservoir and the lubricant. Wicks are too inefficient to deliver sufficient lubricant for high speed machines.

Accordingly, there remains a long felt need for an improved lubrication system that is efficient and does not add heat to the lubricant. The system must include a lubricant pump that minimizes churning and vortexing when withdrawing lubricant from a lubricant reservoir.

BRIEF SUMMARY OF THE INVENTION

The invention relates to a system for lubrication of a bearing mounted around a rotatable vertical shaft. The system includes a reservoir positioned below the bearing for holding a quantity of lubricant, means for withdrawing lubricant from the reservoir and for pumping the withdrawn lubricant to the bearing, a stator, a first passageway for communicating lubricant withdrawn by the withdrawing means to the bearing, and a second passageway for returning lubricant from the bearing to the reservoir. The withdrawing means includes a rotor connected to the shaft. The stator encircles the rotor and extends axially into the reservoir. The stator minimizes vortexing and churning of the lubricant in the reservoir during rotation of the rotor.

It is a principal object of the invention to provide an improved lubrication system that is efficient and does not add heat to the lubricant. Another object of the invention includes a lubrication system that is independent of the direction of rotation and applied axial loads. A further object of the invention includes a lubrication system that is totally enclosed and requires no external piping or auxiliary drive means.

A feature of the invention is to provide a system for lubrication of a bearing mounted around a rotatable vertical shaft. The lubrication system includes a reservoir for holding a quantity of lubricant, means for withdrawing lubricant from the reservoir and for pumping the withdrawn lubricant to the bearing, a stator, and a passageway communicating between the withdrawing means and the bearing. The withdrawing means includes a rotor connected to the shaft. The stator encircles the rotor and extends axially into the reservoir.

Another feature of the invention includes the passageway for communicating lubricant withdrawn from the reservoir around the bearing to a point above the bearing.

Another feature of the invention includes the passageway having a radial channel for receiving withdrawn lubricant from a radial hole in the stator with the radial channel communicating with a vertical channel extending to the point above the bearing.

Another feature of the invention is to provide a lubrication system for a machine having a plurality of bearings mounted around a rotatable vertical shaft. Each bearing has an independent lubricating system including means for withdrawing lubricant from a reservoir and for pumping the withdrawn lubricant through a passageway communicating between the withdrawing means and the bearing.

DETAILED DESCRIPTION OF THE PREFERRED EMBODIMENT

Figure 1:
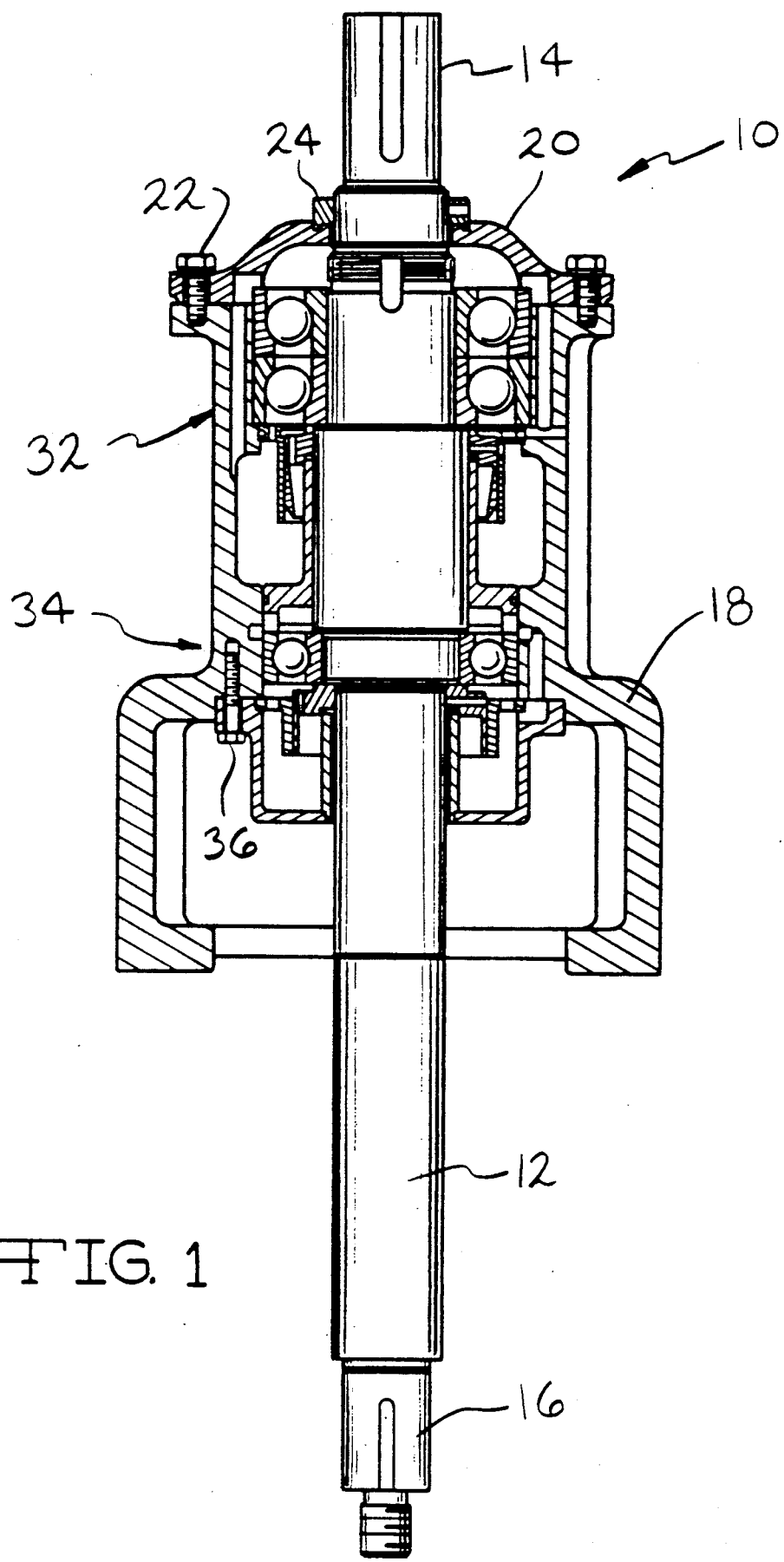
FIG. 1 is a schematic elevational view, partly in section, illustrating one embodiment of the invention for lubricating bearings in a centrifugal pump.

Referring to FIG. 1, reference numeral 10 generally refers to a vertically mounted centrifugal pump. It will be understood the lubricating system of the invention could be used with other machines such as engines, drill motors, and the like. Pump 10 includes a vertical rotatable shaft 12 having an upper end 14 for connection to a high speed motor (not shown) and a lower end 16 for connection to an impeller (not shown). Pump 10 also includes a housing 18, a cover 20 fastened to housing 18 by cap screws 22, and a deflector 24 for sealing cover 20 with shaft 12. The load applied to shaft 12 is supported by an upper duplex thrust bearing 32 and a lower radial bearing 34.

Figure 2:
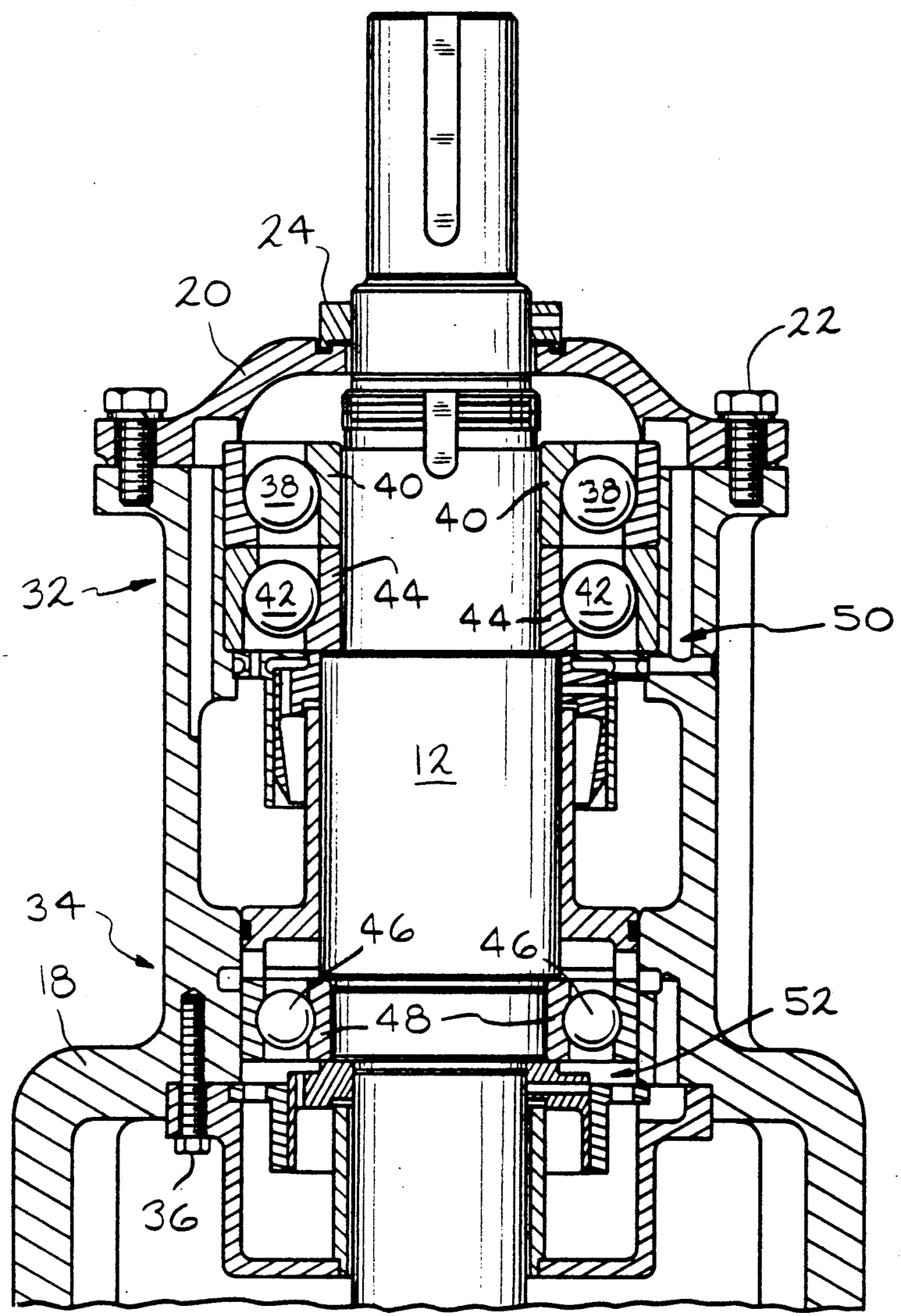
FIG. 2 is an enlarged view illustrating the lubrication system of FIG. 1.

FIG. 2 illustrates upper bearing 32 which includes a double row of ball bearings 38 and 42 mounted back-to-back in bearing races 40 and 44 respectively. Lower bearing 34 includes a single row of ball bearings 46 mounted in a bearing race 48. Upper bearing 32 is provided with a lubricating means 50 and lower bearing 34 is provided with a lubricating means 52 independent of lubricating means 50. Although it will be understood a single lubricating means could be used to lubricate both bearings, independent lubricating means for each bearing of a machine is preferred. Independent lubricating means advantageously increases the lubricant capacity to reduce lubricant recycling rates, provides more lubricant reservoir surface area for better heat dissipation, reduces heat transfer between bearings, and results in substantially lower operating temperature particularly for machines which pump hot liquids.

Figure 3:
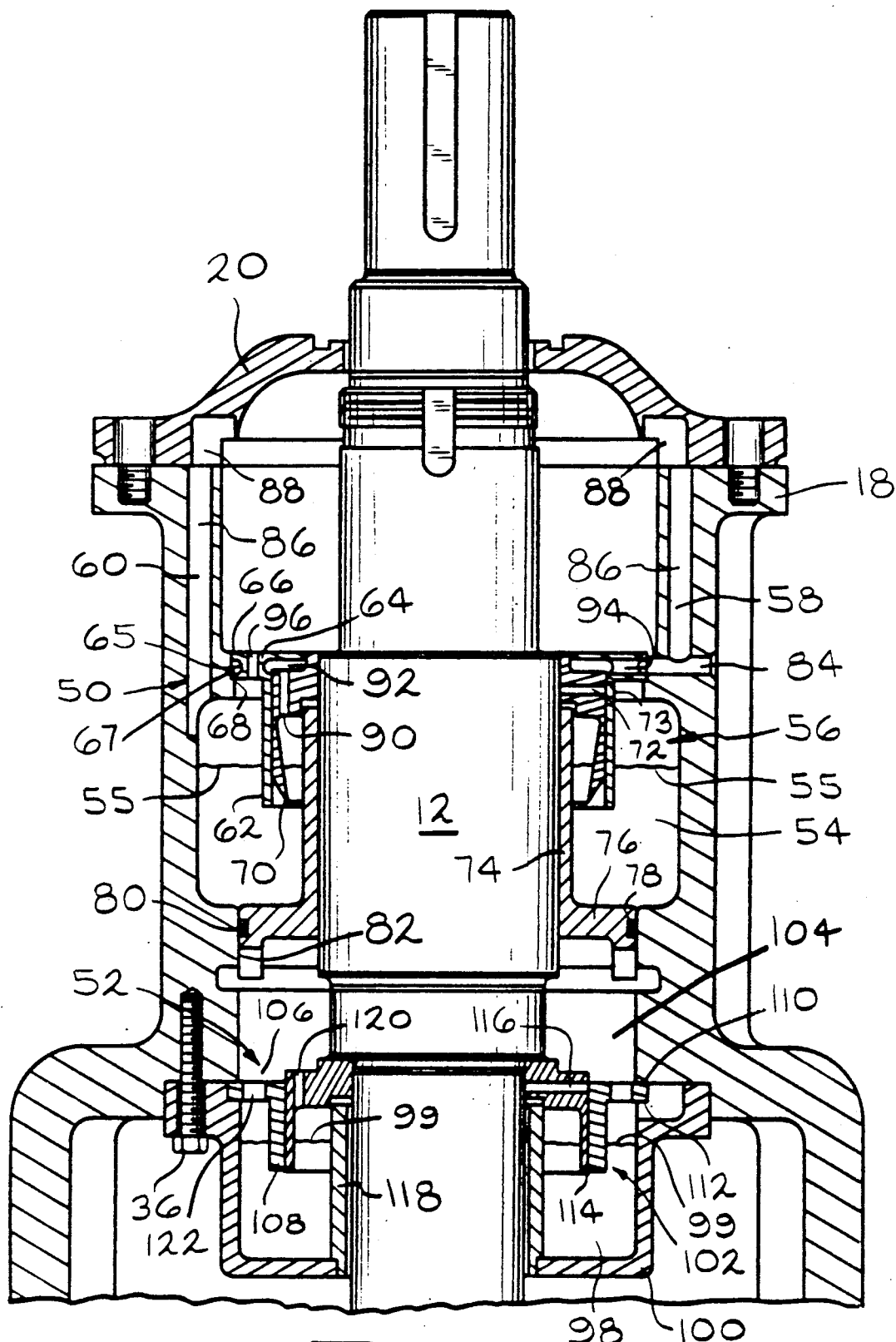
FIG. 3 is the same as FIG. 2 except the bearings have been removed.

FIG. 3 shows details of lubricating means 50 and 52 with bearings 32 and 34 removed for clarity. Upper lubricating means 50 includes an annular reservoir 54 containing a lubricant 55 such as oil, means 56 for withdrawing lubricant from reservoir 54 and for pumping the withdrawn lubricant to bearing 32, a stator 62, a passageway 58 communicating with withdrawing means 56 to deliver the withdrawn lubricant to bearing 32, and a passageway 60 for returning the lubricant to reservoir 54. Withdrawing means 56 includes a rotor 70 connected to shaft 12 for rotation by screws 72. Stator 62 encircles rotor 70 and axially extends into lubricant 55 in reservoir 54. Stator 62 includes an upper flange 64 having a groove 65 defined by a pair of lips 66. Stator 62 is supported and prevented from rotation by frictional engagement with a ring 67 received by groove 65 and a shoulder 68, both on the inside surface of housing 18. The outer diameter of rotor 70 should be just slightly less than the inner diameter of stator 62 so that the spacing between the sidewalls of rotor 70 and stator 62 is small. By small is meant no greater than about 0.020 inch (0.5 mm). Preferably, the spacing should not exceed about 0.012 inch (0.3 mm). Reservoir 54 includes a seal gland 74 having a flange 76. A seal for lubricant 55 in reservoir 54 is formed by contacting inside surface 82 of housing 18 by an o-ring 80 provided in a recess 78 in flange 76 of seal gland 74. Passageway 58 includes a radially extending channel 84 bored in housing 18 for passing lubricant withdrawn from reservoir 54 to a vertical channel 86 to a point above bearing 32 to a cross-over 88. Lubricant is withdrawn from reservoir 54 and pumped to radial channel 84 by passing through vertically extending passages 90 in rotor 70, into a cavity 92, and through radially extending passages 94 in flange 64 of stator 62. After flowing by gravity through bearing 32, the lubricant is returned to reservoir 54 by passing through vertically extending passages 96 in flange 64 of stator 62. Stator 62 acts as a baffle so that the lubricant drained back to reservoir 54 is not immediately recycled back to bearing 32. A hydraulic seal is created in the space between rotor 70 and stator 62 to prevent a direct return of the withdrawn lubricant as it becomes pressurized above rotor 70. Flange 64 acts as a baffle plate to prevent the pressurized withdrawn lubricant from entering lower ball bearings 42 to prevent flooding which would result in churning and excess heat being generated.

Lower lubricating means 52 illustrated in FIG. 3 includes an annular reservoir 98 containing a lubricant 99, an oil pan 100, means 102 for withdrawing lubricant from reservoir 98 and for pumping the withdrawn lubricant to bearing 34, a stator 108, a passageway 104 communicating with withdrawing means 102 to deliver the withdrawn lubricant to bearing 34, and a passageway 106 for returning the lubricant to reservoir 98. Withdrawing means 102 includes a rotor 114 connected to shaft 12 for rotation by screws 116. Stator 108 encircles rotor 114 and extends into lubricant 99 in reservoir 98. Stator 108 includes a flange 110 and is supported and prevented from rotation by frictional engagement with a shoulder 112 on oil pan 100. Oil pan 100 is connected to housing 18 for support by screws 36. As described above for withdrawing means 56, the spacing between the sidewalls for rotor 114 and stator 108 also should be small. Oil pan 100 includes an integral seal 118 for lubricant 99 in reservoir 98. Unlike upper lubricating means 50 where the lubricant is pumped to a point above ball bearings 38, lubricating means 52 pumps lubricant up through passages 120 in rotor 114 where the lubricant contacts the bottom of ball bearings 46. Lubricant is returned to reservoir 98 through passages 122 in flange 110 of stator 108. Stator 108 also acts as a baffle to prevent immediate recycling of the lubricant drained back to reservoir 98.

Figure 4:
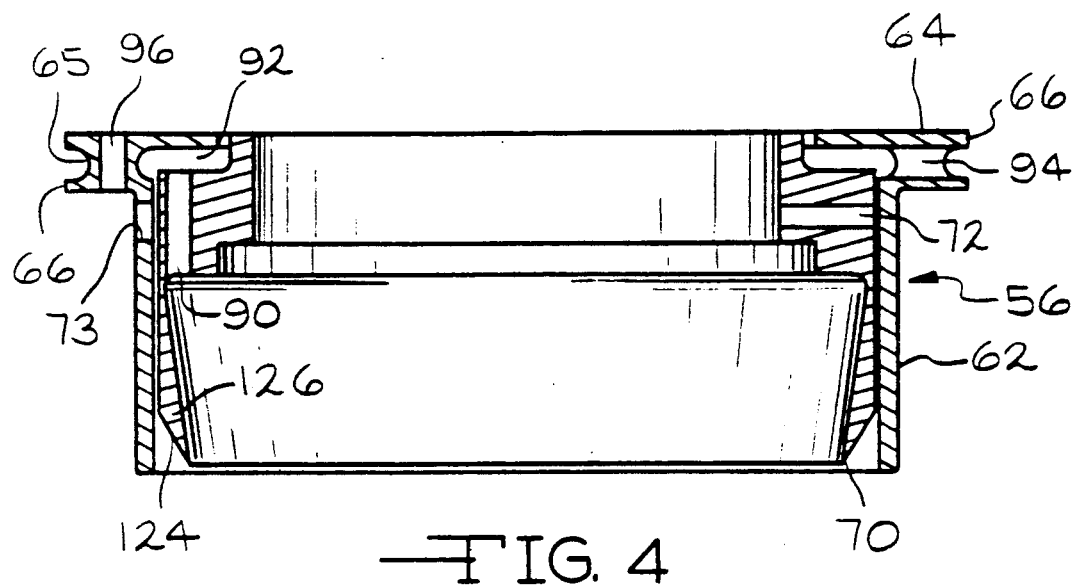
FIG. 4 is an elevation view of the upper rotor and stator in FIG. 3.
Figure 5:
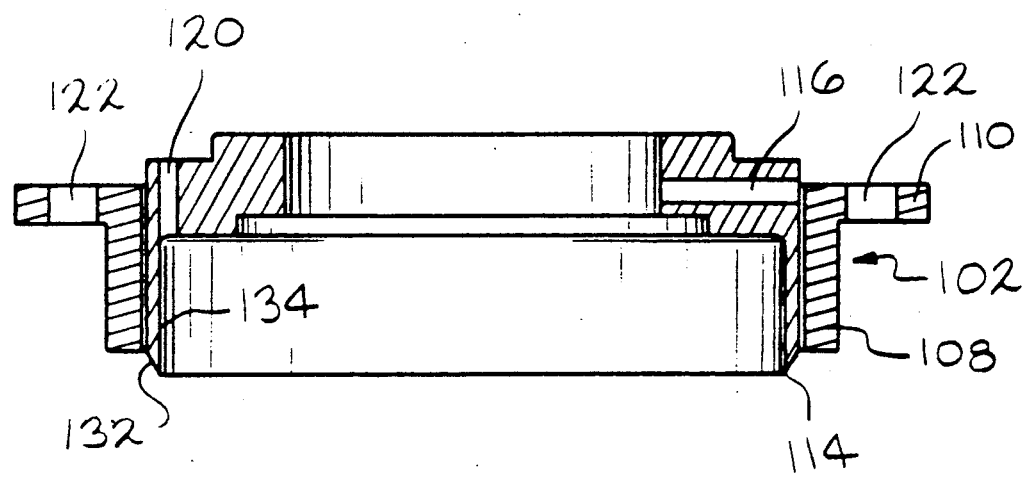
FIG. 5 is an elevation view of the lower rotor and stator in FIG. 3.
Figure 6:
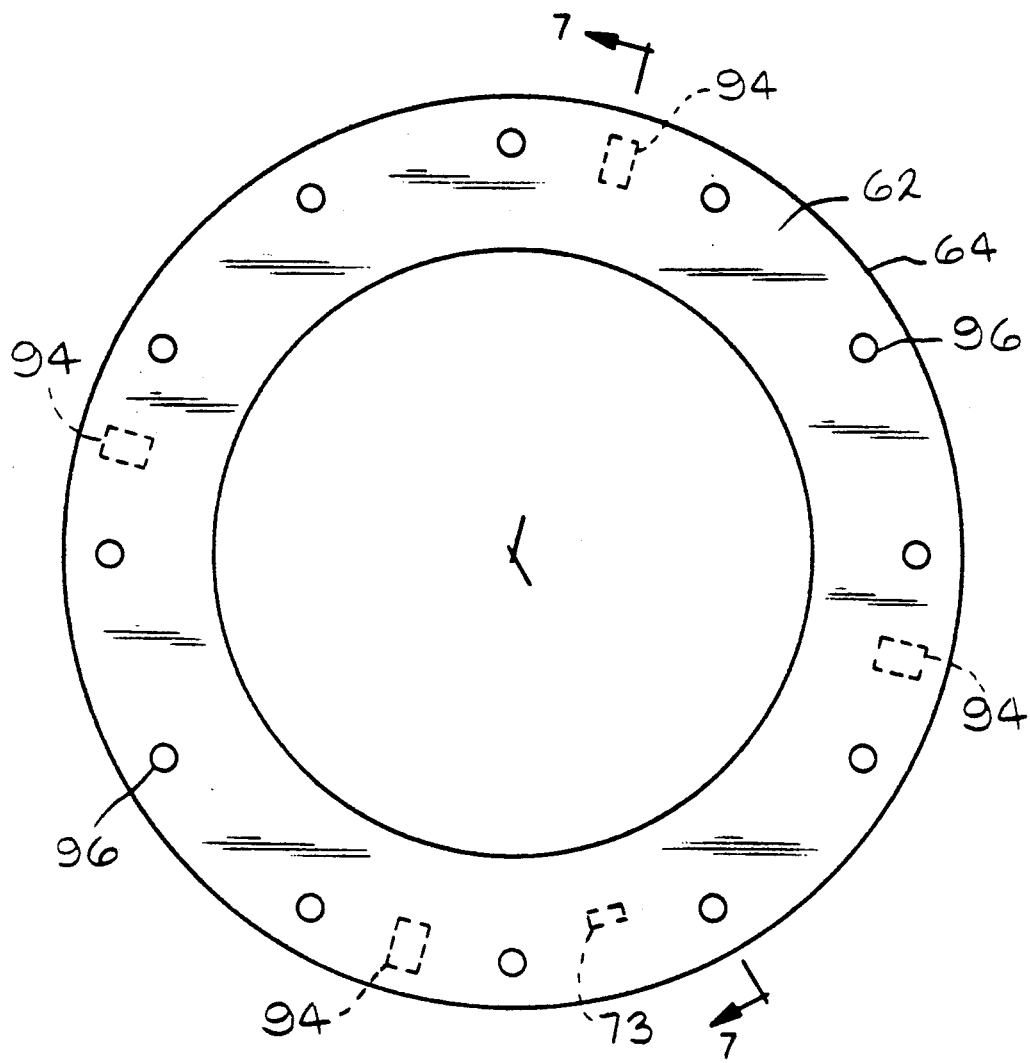
FIG. 6 is a plan view of the stator shown in FIG. 4.
Figure 7:
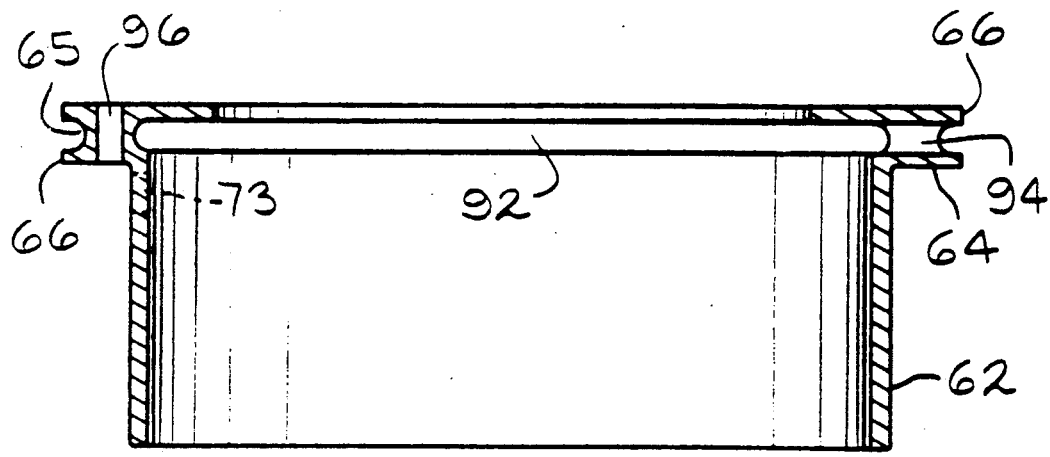
FIG. 7 is an elevation view along line 7—7 of the stator shown in FIG. 6.
Figure 8:
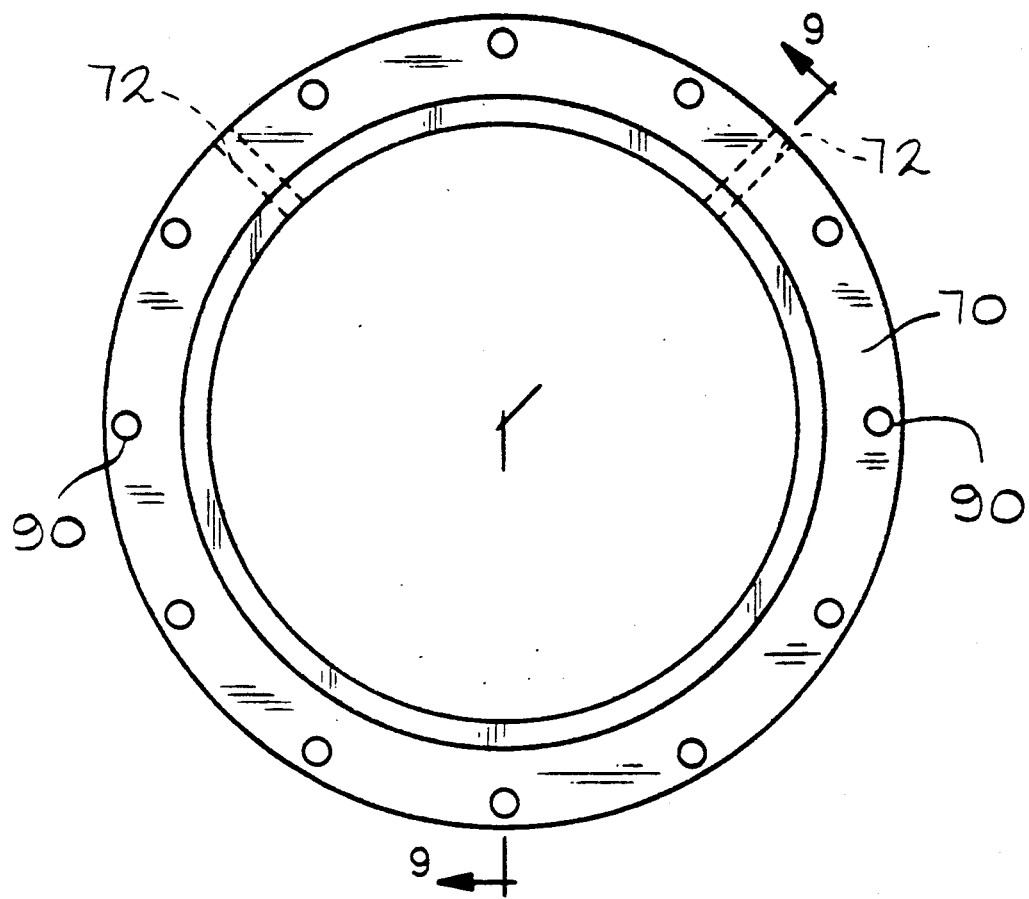
FIG. 8 is a plan view of the rotor shown in FIG. 4.

FIGS. 6–9 show details of stator 62 and rotor 70 shown in FIG. 4 and FIGS. 10–13 show details of stator 108 and rotor 114 shown in FIG. 5. Stator 62 preferably includes a radial hole 73 for accessing screws 72 to secure rotor 70 to shaft 12.

Figure 9:
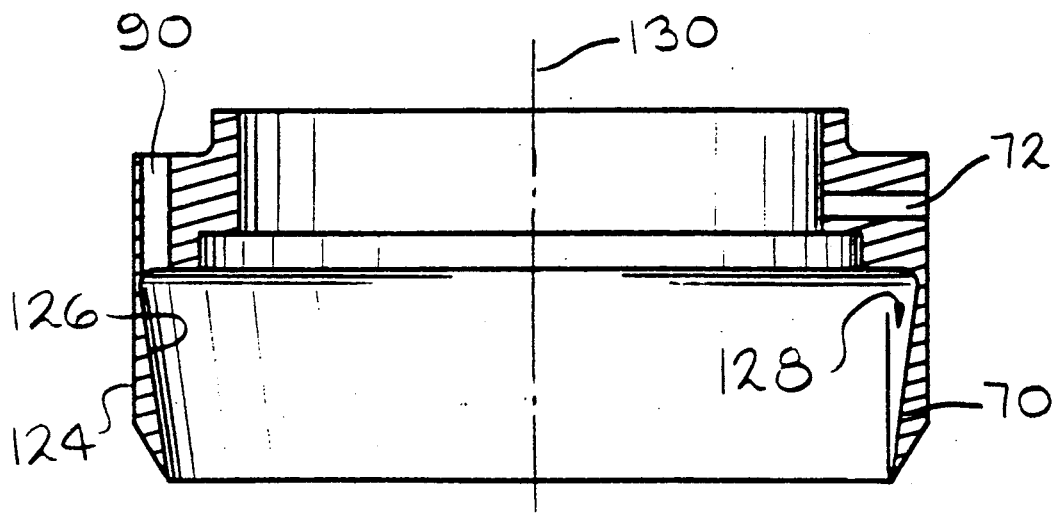
FIG. 9 is an elevation view along line 9—9 of the rotor shown in FIG. 8.
Figure 10:
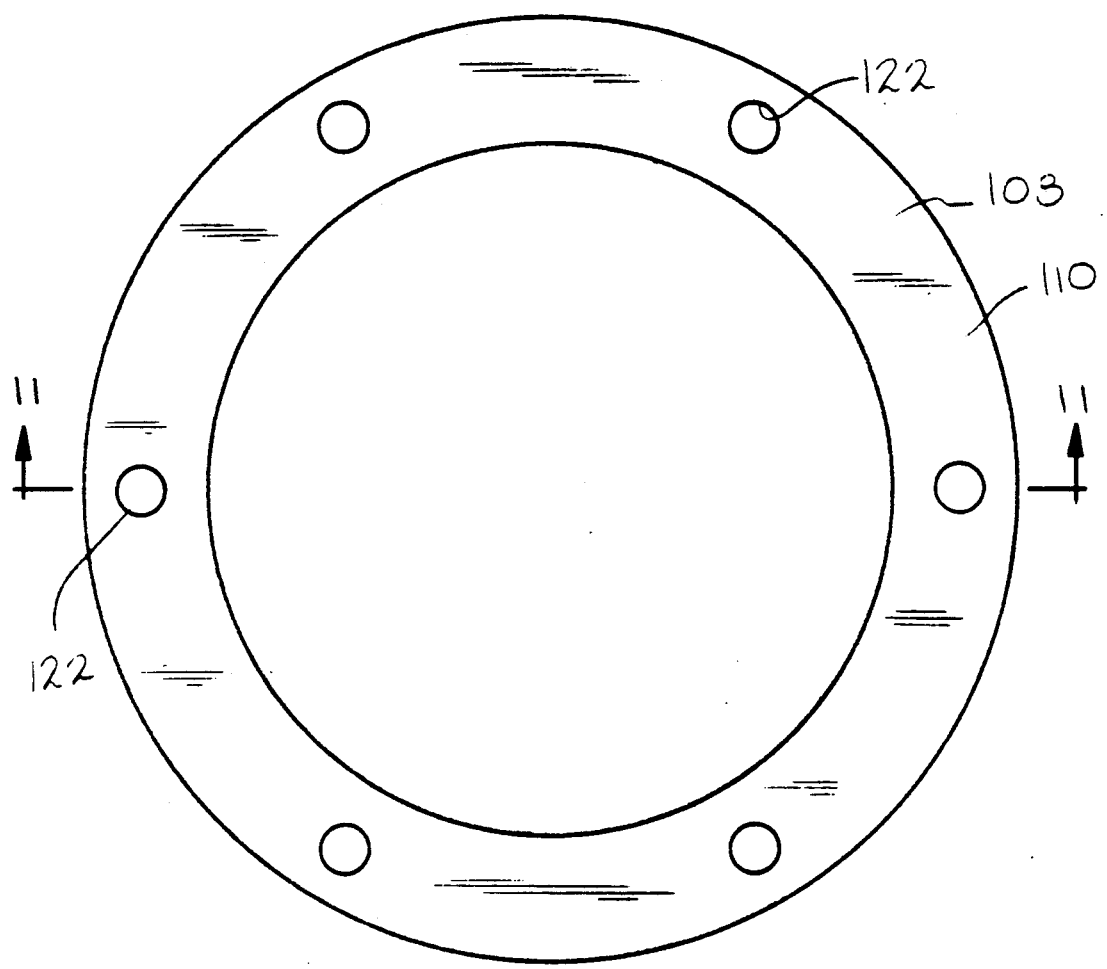
FIG. 10 is a plan view of the stator shown in FIG. 5.
Figure 11:
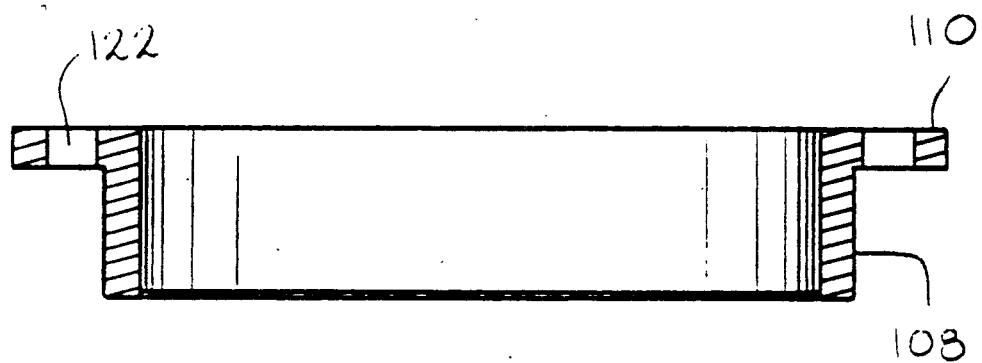
FIG. 11 is an elevation view along line 11—11 of the stator shown in FIG. 10.
Figure 12:
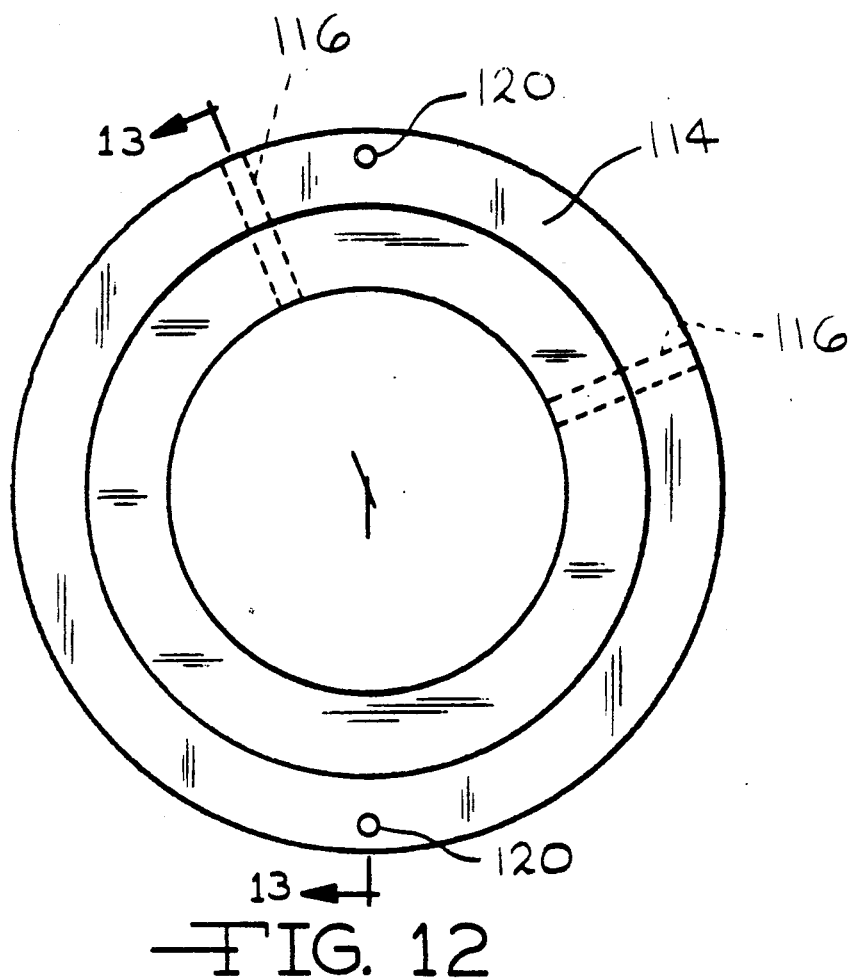
FIG. 12 is a plan view of the rotor shown in FIG. 5.
Figure 13:
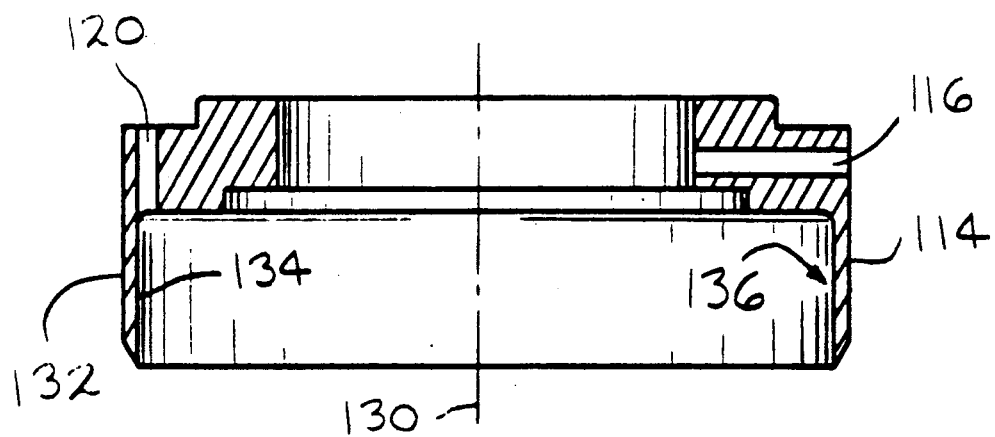
FIG. 13 is an elevation view along line 13—13 of the rotor shown in FIG. 12.

In the present invention, a rotor provides means for not only withdrawing lubricant from a reservoir but also for pumping the withdrawn lubricant upwardly to a bearing. To provide the centrifugal force necessary to lift lubricant from the reservoir, the inside surface of the portion of the rotor extending into the lubricant must be inclined at an angle relative to the axis of the pump shaft. Referring to FIG. 9, rotor 70 includes a blade portion 124 having an inside surface 126 for extending into lubricant 55 in reservoir 54. Inside surface 126 is inclined at an angle 128 relative to vertical pump axis 130 of shaft 12. The amount of angle 128 depends upon the amount of lubricant required to lubricate a bearing and the length of the passageway through which the lubricant must be pumped. Preferably, the angle 128 should be at least about 7.0° for passageway 50 for double row bearing 32 illustrated in FIGS. 1–3. It was determined an angle of about 7.5° provides the necessary lift and volume of lubricant to lubricate bearing 32. Rotor 114 shown in FIG. 13 includes a blade portion 132 having an inside surface 134. Inside surface 134 preferably is inclined at an angle 136 of about 0.5° relative to vertical pump axis 130 of shaft 12. Unlike bearing 32 where the withdrawn lubricant is pumped outwardly through radial channel 84 and upwardly through channel 86 to a point above ball bearings 38, withdrawn lubricant for bearing 34 need only be pumped upwardly through passages 120 in rotor 114 to just contact the bottom of ball bearings 46. That is to say, the distance of lubricant travel for bearing 32 is greater than that for bearing 34.

As indicated above, withdrawing means 102 of lubricating means 52 for bearing 34 pumps the withdrawn lubricant directly to the lower portions of ball bearings 46. Withdrawing means 56 of lubricating means 50 for bearing 32 is specially designed to prevent flooding of lower ball bearings 42 that might result if lubricant were pumped up through lower ball bearings 42 to upper ball bearings 38. Flooded bearings would result in lubricant churning which would result in heat generation. The lower portion of passageway 58 is communicated around or bypasses ball bearings 42 and 38 to a point above the upper row of ball bearings 38. As shown in FIGS. 3 and 4, lubricant 55 from reservoir 54 will travel upwardly along inclined inside surface 126 of spinning rotor 70 through holes 90. The lubricant then flows into cavity 92 before being slung outwardly through radial passages 94 of stator 62 and radial channel 84 of passageway 58.

Because the stators are coaxially spaced closely adjacent to the outer surface of the rotors, the lubricant in the reservoirs spins only in that portion of the reservoir between the rotor blade and the seal gland. For example, lubricant 55 in reservoir 54 spins only between inclined surface 126 of rotor 70 and seal gland 74. The remaining portion of lubricant 55 in reservoir 54 between the outer surface of stator 62 and inside surface 82 of housing 18 does not spin. Stator 62 creates an inner boundary within reservoir 54 that eliminates churning of lubricant 55 by blade 124 of rotor 70 and prevents vortexing of lubricant 55 in the outer portion of reservoir 54. Of course, stator 108 in reservoir 98 functions similarly to eliminate churning and minimizing vortexing of lubricant 99.

Operation of the lubrication system will now be described. When pump 10 is activated, rotation of shaft 12 by the pump motor causes rotation of rotors 70 and 114. Rotation of rotors 70 and 114 causes lubricant 55 and 99 in reservoirs 54 and 98 respectively to spin as described above. Centrifugal force caused by spinning of the lubricant results in a portion of lubricant 55 in reservoir 54 to rise upwardly along inclined surface 126 of blade 124 of rotor 70. The withdrawn lubricant is pumped upwardly through passages 90 and into cavity 92. As a result of the pressure differential between cross-over 88 and cavity 92 caused by the rotation of rotor 70, the withdrawn lubricant is pumped through radial passages 94 in stator 62, radial channel 84, vertical channel 86, and through cross-over 88 which is above ball bearings 38. The withdrawn lubricant now flows by gravity through ball bearings 38 and 42. The withdrawn lubricant continues flowing downwardly through passages 96 in flange 64 of stator 62 to reservoir 54. Rotor 114 withdraws lubricant 99 from reservoir 98 in a similar manner. The lubricant is withdrawn upwardly along inclined surface 134 of blade 132 through passages 120. Unlike lubricating means 50 described above wherein the withdrawn lubricant is communicated around and to a point above bearing 32, the withdrawn lubricant for lubricating means 52 is passed directly from passages 120 in rotor 114 to the bottom side of ball bearings 46. Rotation of ball bearings 46 transfers the withdrawn lubricant to their upper surfaces where the lubricant then flows by gravity back to reservoir 98 through passages 122 in flange 110 in stator 108.

While only one embodiment has been described, it will be understood various modifications may be made to the invention without departing from the scope of it. For example, the lubrication system can be incorporated with a variety of machines such as centrifugal pumps, engines, drill motors, and the like that include a bearing mounted around a rotatable vertical shaft. For those machines including a plurality of bearing sets, each bearing preferably includes an independent lubrication system. For a multiple row bearing, the passageway for communicating lubricant to the bearing preferably communicates the lubricant around and to a point above the bearing. Therefore, the limits of the invention should be determined from the appended claims.

We claim:

1. A lubrication system for the lubrication of a bearing mounted on
   a rotatable vertical shaft, comprising:
   a reservoir for holding a quantity of lubricant,
   means for withdrawing lubricant from said reservoir,
   said withdrawing means including a rotor connected to the shaft, a stator encircling said rotor and extending axially into said reservoir,
   a first passageway for communicating lubricant from said reservoir to said bearing,
   a second passageway for returning lubricant from said bearing to said reservoir,
   whereby said stator minimizes vortexing and churning of the lubricant in said reservoir during rotation of said rotor.

2. The lubrication system of claim 1 wherein said first passageway communicates lubricant to a point above said bearing.

3. The lubrication system of claim 2 wherein said first passageway includes a radial channel extending from said stator and a vertical channel extending to said point above said bearing.

4. The lubrication system of claim 3 wherein said stator includes a radial passage for communicating lubricant to said radial channel.

5. The lubrication system of claim 1 wherein said stator includes a flange, a passage in said flange for passing lubricant from said second passageway to said reservoir.

6. The lubrication system of claim 1 wherein said reservoir is positioned below said bearing.

7. A lubrication system for the lubrication of an upper and a lower bearing each mounted on a rotatable vertical shaft, comprising:
   reservoir means for holding a quantity of lubricant,
   means for withdrawing lubricant from said reservoir means,
   said withdrawing means including a rotor connected to the shaft and a stator encircling said rotor,
   said stator extending axially into said reservoir means,
   a first passageway means for communicating lubricant from said reservoir means to the bearings,
   a second passageway means for returning lubricant from the bearings to said reservoir means,
   whereby said stator minimizes vortexing and churning of the lubricant in said reservoir means during rotation of said rotor.

8. The lubrication system of claim 7 wherein
   said rotor of said withdrawing means includes a blade having an inside surface, said inside surface inclined at an angle relative to the axis of said shaft of about 7.5°.

9. A centrifugal pump, comprising:

a rotatable vertical shaft, a bearing mounted around said shaft, an annular reservoir for holding a quantity of lubricant, said reservoir mounted around said shaft below said bearing, means for withdrawing lubricant from said reservoir, said withdrawing means including a rotor connected to said shaft, a stator encircling said rotor and extending axially into said reservoir, a first passageway for communicating lubricant from said reservoir to said bearing, a second passageway for returning lubricant from said bearing to said reservoir, whereby said stator minimizes vortexing and churning of the lubricant in said reservoir during rotation of said rotor.

10. The centrifugal pump of claim 9 including an upper bearing and a lower bearing, each said bearing provided with said first passageway, said first passageway of said upper bearing including a radial channel for communicating lubricant to a vertically extending channel, said vertically extending channel for communicating lubricant to a point above said upper bearing.

11. The centrifugal pump of claim 10 wherein said upper bearing includes a double row of thrust ball bearings and said lower bearing includes a single row of radial ball bearings.

12. A centrifugal pump, comprising:

a rotatable vertical shaft, an upper bearing and a lower bearing each mounted around said shaft, said upper bearing including a double row of thrust ball bearings and said lower bearing including a single row of radial ball bearings, reservoirs for holding a quantity of lubricant, one of said reservoirs positioned below each of said bearings, means for withdrawing lubricant from each of said reservoirs, each of said withdrawing means including a rotor connected to said shaft, a stator encircling each said rotor and extending axially into each said reservoir, first passageways for communicating lubricant from each of said reservoirs to said bearings, second passageways for returning lubricant from each of said bearings to said reservoirs, said first passageway of said upper bearing including a radial channel for communicating lubricant to a vertically extending channel, said vertically extending channel for communicating lubricant to a point above said upper bearing to prevent flooding of said thrust ball bearings, whereby said stators minimize vortexing and churning of the lubricant in said reservoirs during rotation of said rotors.

13. A lubrication system for the lubrication of a bearing mounted on a rotatable vertical shaft, comprising:

a reservoir for holding a quantity of lubricant, the bearing including a double row of ball bearings, means for withdrawing lubricant from said reservoir, said withdrawing means including a rotor connected to the shaft and a stator encircling said rotor, said stator extending axially into said reservoir, a first passageway for communicating lubricant from said reservoir to the bearing, a second passageway for returning lubricant from the bearing to said reservoir, whereby said stator minimizes vortexing and churning of the lubricant in said reservoir during rotation of said rotor.

* * * * *